United States Patent Office 3,311,669
Patented Mar. 28, 1967

3,311,669
ACID-CATALYZED REACTIONS OF
NAPHTHALENE
Ronald D. Bushick, Glen Mills, Pa., assignor to Sun Oil
Company, Philadelphia, Pa., a corporation of New
Jersey
No Drawing. Filed July 11, 1966, Ser. No. 564,713
8 Claims. (Cl. 260—668)

This invention relates to a hydrocarbon conversion process and it pertains more particularly to the reactions of naphthalene with paraffin hydrocarbons or benzene in the presence of a hydrogen fluoride and boron trifluoride catalyst.

It is known that polycyclic aromatic hydrocarbons may effect an intermolecular condensation in the presence of hydrogen fluoride or hydrogen fluoride and boron trifluoride catalysts in the absence of mononuclear aromatic hydrocarbons. For example, the following reaction may be effected:

(1)

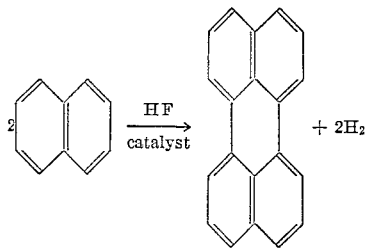

It is also known that an aromatic hydrocarbon such as benzene can be converted with a paraffin hydrocarbon such as normal pentane, hexane, heptane, etc., to alkylated aromatic compounds. United States Patent 2,430,516 teaches alkylating aromatic hydrocarbons with paraffin hydrocarbons, said alkylation being effected in the presence of a hydrogen fluoride-boron trifluoride catalyst at a temperature within the approximate range of 180 to 400° F.

The present invention relates to a process for reacting naphthalene with normal paraffin hydrocarbons or benzene in the presence of a hydrogen fluoride-boron trifluoride catalyst at temperatures in the range of 0 to 70° C. When benzene is the reactant with naphthalene, a condensation reaction takes place accompanied by hydrogenation and dehydrogenation to produce substantial yields of 1-phenyl-3,4-dihydronaphthalene along with 1-phenyl-1,2,3,4-tetrahydronaphthalene and 1-phenylnaphthalene.

(2)

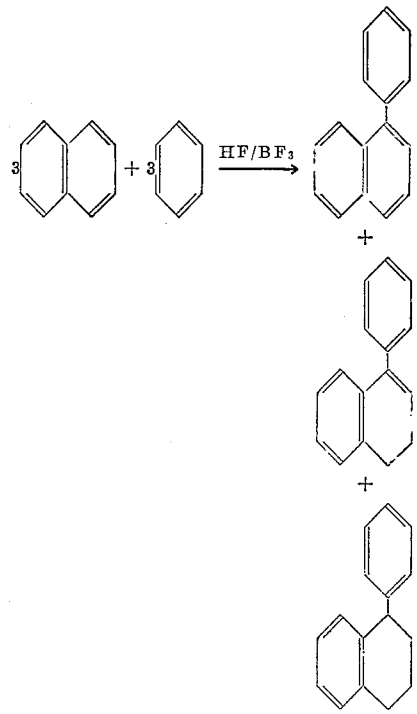

When paraffins are the reactants with naphthalene, alkylation occurs accompanied, surprisingly, by splitting of the alkyl chain between the number 4 and 5 carbons and cyclization to the corresponding polycyclic, hydrogenated aromatic compound. For example, naphthalene reacted with a normal paraffin gives significant yields of tetrahydroanthracene. Among the suitable normal paraffin hydrocarbons are those having at least five carbon atoms per molecule, such as for example normal pentane, hexane, heptane, octane, etc. The preferred normal paraffin is n-heptane which reacts with naphthalene as follows:

(3)

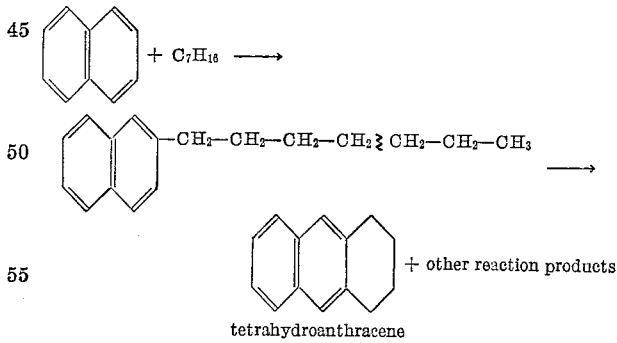

The conversion temperature of this reaction is important since only sufficiently low temperatures give the desired tetrahydroanthracene. The conversion may be effected at a temperature in the range of 0 to 70° C. but 25 to 65° C. is the preferred range. The temperature should not be allowed to rise to 80° C. or above where cyclization does not occur.

When benzene is the reactant, the suitable temperature also ranges from 0 to 70° C. but 5 to 45° C. is the preferred range.

In either case the process is operated at a pressure sufficient to maintain substantial liquid phase conversion conditions. In the process of this invention, the proportions of catalysts are important. The hydrogen fluoride should be in molar excess over boron trifluoride. Neither hydrogen fluoride nor boron trifluoride used alone will give satisfactory results. Mole ratios of hydrogen fluoride to boron trifluoride in the range of 10:1 to 35:1 are preferred for maximum effectiveness. An amount of boron trifluoride ranging from a catalytic amount up to excess boron trifluoride to naphthalene is suitable but mole ratios from 0.5:1 to 1:1 are preferred.

Reaction times for the process of from a few minutes up to two hours are suitable. The range of 10 to 60 minutes is preferred.

The normal paraffins or benzene should be present in the reaction mixture in a molar excess over moles of naphthalene since at lower mole ratios, the intermolecular condensation reaction of Equation 1 competes with the desired process. The upper limit of the mole ratio of normal paraffins or benzene to naphthalene is not critical. A preferred ratio lies in the range of 2:1 to 10:1.

The reaction of this invention can be carried out in any convenient manner using conventional type equipment. For example, the naphthalene and paraffin or benzene are charged in to a closed reaction vessel equipped with heating and agitating means. The required amount of HF is then added and the mixture heated to the desired reaction temperature. The $BF_3$ is added and the vessel shaken or the contents otherwise agitated in order to insure efficient contact of the $HF$-$BF_3$ catalyst with the mixture of starting materials. After adding the $BF_3$ the reaction mass is maintained at the desired reaction temperature for the desired contact time.

At the end of the reaction period the vessel is opened to effect the removal of most of the $BF_3$ (B.P.=−101° C.) and much of the HF (B.P.=19.4° C.). Any remaining HF and any dissolved $BF_3$ can be distilled from the vessel. If it is desired to remove the HF as a liquid rather than as a gas the reaction vessel is cooled to below 19.4° C. and opened to remove the $BF_3$. The reaction mass is quenched in ice water resulting in the separation of an aqueous acid layer and an organic layer. If desired, the acid can be neutralized by adding $Na_2CO_3$, the organic layer decanted and washed with water. Dilution of the organic layer with a solvent such as pentane facilitates the decanting step.

The products of the reaction can be removed from the organic layer in any convenient manner, as for example, vacuum distillation or chromatographic techniques.

The following examples illustrate the invention:

EXAMPLE I

The reaction vessel was a small reactor equipped with a shaker and heating and cooling means. The reactor was flushed out with nitrogen. Heptane (0.1 mole) and naphthalene (0.05 mole) were then charged into the reactor and were solidified using liquid nitrogen. The reactor was evacuated and HF added. The reactor was agitated and heated to 50° C. where $BF_3$ was added. The $BF_3$ pressure was sufficient to maintain essentially all of the HF in liquid phase. The reactor was held at 50° C. for 60 minutes from the time of $BF_3$ addition. Shaking of the reactor was continued throughout the reaction time. The vessel was then cooled to 15° C., and the contents quenched in ice. The resulting two phases were neutralized with $Na_2CO_3$ after which the organic layer was drawn off and washed several times with twice its volume of water. The organic layer was analyzed by vapor phase chromatography with results as given in the table, Run No. 1.

TABLE

|  | Run 1 | Run 2 | Run 3 |
|---|---|---|---|
| Charge (moles): |  |  |  |
| Heptane | 0.10 | 0.10 |  |
| Benzene |  |  | 0.23 |
| Naphthalene | 0.05 | 0.05 | 0.05 |
| HF | 1.02 | 1.04 | 1.11 |
| $BF_3$ | 0.05 | 0.04 | 0.04 |
| Reaction Time (minutes) | 60 | 30 | 15 |
| Reaction Temperature, ° C. | 50 | 30 | 30 |
| Product Distribution (wt. percent): |  |  |  |
| Naphthalene | 19.6 | 33.8 | 30.2 |
| THA [1] | 14.0 | 8.3 | 5.6 |
| PDHN [1] | 0.9 | 1.8 | 20.1 |
| PTHN [1] | 1.1 | 4.7 | 1.1 |
| PN [1] | 5.5 | 4.6 | 5.6 |
| Binaphthyls [2] | Remainder | Remainder | Remainder |

[1] THA=Tetrahydroanthracene; PDHN=1-phenyl-3,4-dihydronaphthalene; PTHN=1-phenyl-1,2,3,4-tetrahydronaphthalene; PN=1-phenylnaphthalene.
[2] The high-boiling fraction probably consisted of binaphthyls and partially hydrogenated binaphthyls. The following were shown to be present by mass spectroscopy:

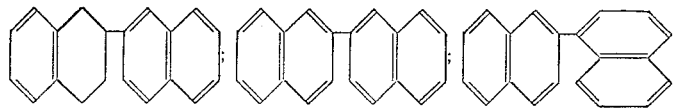

EXAMPLE II

The procedure of Example I was repeated but with shorter reaction times and lower temperatures with results as given in the table, Run No. 2.

EXAMPLE III

Benzene was reacted with naphthalene using the procedure of Example I with reaction conditions and results as given in Run 3 of the table.

The compounds produced by the process of this invention are known and their utility is well known in the art. For example, 1-phenylnaphthalene, 1-phenyl-3,4-dihydronaphthalene, and 1 - phenyl - 1,2,3,4 - tetrahydronaphthalene are useful in making dyes and tetrahydroanthracene is a useful precursor to polycarboxylic acids which are used to make polymers.

What is claimed is:

1. A process for producing tetrahydroanthracene which comprises contacting naphthalene with a molar excess of a normal paraffinic hydrocarbon over moles of naphthalene in the presence of a catalyst consisting essentially of hydrogen fluoride and boron trifluoride, at a conversion temperature between 0 and 70° C., under a pressure sufficiently high to maintain substantially liquid phase conversion conditions.

2. A process according to claim 1 in which the molar ratio of normal paraffinic hydrocarbon to naphthalene is between about 2:1 to about 10:1.

3. A process according to claim 2 in which the temperature is in the range of 25 to 65° C.

4. A process according to claim 2 in which said normal paraffinic hydrocarbon is n-heptane.

5. A process according to claim 3 in which said normal paraffinic hydrocarbon is n-heptane.

6. A process for producing a condensation product comprising 1-phenyl-3,4-dihydronaphthalene which comprises contacting naphthalene with a molar excess of benzene, in the presence of a catalyst consisting essentially of hydrogen fluoride and boron trifluoride, at a conversion temperature between 0 and 70° C., under a pressure sufficiently high to maintain substantially liquid phase conversion conditions.

7. A process according to claim 6 in which the molar ratio of benzene to naphthalene is between 2:1 to about 10:1.

8. A process according to claim 7 in which the temperature is in the range of 5 to 45° C.

References Cited by the Examiner
UNITED STATES PATENTS

| | | | |
|---|---|---|---|
| 2,430,516 | 11/1947 | Lien et al. | 260—671 |
| 2,884,469 | 4/1959 | McCaulay | 260—671 |
| 3,244,758 | 4/1966 | Eberhardt | 260—671 X |

DELBERT E. GANTZ, *Primary Examiner.*

C. R. DAVIS, *Assistant Examiner.*